3,514,416
FOAMABLE COMPOSITIONS
Donald G. Needham, Bartlesville, Okla., assignor to Phillips Petroleum Company, a corporation of Delaware
No Drawing. Continuation-in-part of application Ser. No. 600,775, Dec. 12, 1966. This application Mar. 17, 1969, Ser. No. 807,935
Int. Cl. C08c 17/10; C08f 47/10; C08j 1/18
U.S. Cl. 260—2.5                                           19 Claims

ABSTRACT OF THE DISCLOSURE

Accelerated foaming agent decomposition in the presence of lake dyes and/or selected metal resinates is negated by having a retardant comprising magnesium stearate and either stearic acid or polyethylene glycol.

Background of the invention

This application is a continuation-in-part application of my copending application having Ser. No. 600,775, filed Dec. 12, 1966, now abandoned.

This invention relates to foamable compositions. In one aspect, foaming agent activation temperature is elevated by adding an activation retarder composition comprising magnesium stearate and either stearic acid or a polyglycol or both. In another aspect, the foaming agent decomposition accelerating effect of certain pigments is offset by a foaming agent retardant composition comprising magnesium stearate and either stearic acid or a polyglycol or both. In another aspect, thermoplastic foamable compositions comprise a pigment, magnesium stearate and either stearic acid or a polyglycol or both and a thermoplastic polymeric material. In another aspect, magnesium stearate and either stearic acid and/or a polyglycol are added to foamable compositions containing lake pigments or selected metal resinate pigments and nitrogen evolving foaming agents.

It is generally known in the art that certain materials accelerate the dissociation of nitrogen evolving compounds often employed as foaming agents for naturally occurring or synthetic thermoplastic or elastomeric materials. The usual effect of these materials is that the activation temperature of the foaming agent is lowered and, in some instances, is reduced below the temperature at which optimum foaming takes place. It is also known in the art that certain additives can be incorporated into foaming compositions to offset this effect; i.e., to retard the decomposition of the foaming agent, thereby elevating its activation temperature to a level at which satisfactory foaming can be effected.

The principal problem in controlling foaming agent activation temperature is that of preventing the substantial decomposition of foaming agent at temperatures below those at which the foamable material is sufficiently ductile to allow the formation of the desired foamed structure.

The problem of controlling foaming agent activation temperature is critical in some situations in which relatively high melting point materials are employed and where additives, for example, pigments, have a pronounced effect on activation temperature.

Still other problems arise from the use of retarding agents to increase effective activation temperatures where substantial amounts of retarder are required. Similarly the use of certain compounds to effect this retarding action in particular applications has a deleterious effect on the finished product properties or processibility of the foaming composition due solely to the characteristic of the retardant. For example, excessive concentrations of some retardant compositions excessively lubricate the foaming composition thereby complicating processibility and adversely influencing the structural properties of the finished article.

It is therefore one object of this invention to provide an improved foaming agent retarder composition. It is another object of this invention to provide a composition suitable for increasing activation temperature of foaming agents. It is yet another object of this invention to provide a composition and method for increasing the foaming agent activation temperature of foamable compositions. It is yet another object of this invention to provide an improved foamable composition and foamed product produced therefrom.

Summary of invention

In accordance with one embodiment of this invention, the activation temperature of foaming agents is increased by adding to foamable compositions containing the same a retardant composition comprising magnesium stearate and either stearic acid or a polyglycol or both.

In accordance with another embodiment of this invention, the activation temperature of nitrogen evolving foaming agents is increased by adding to mixtures thereof with either natural or synthetic foamable materials and constituents having the effect of accelerating foaming agent decomposition or reducing activation temperature, a retardant composition comprising magnesium stearate and either stearic acid or a polyglycol or both.

Description of preferred embodiments

The foaming agent activators or activation temperature reducing agents are usually materials added to foamable compositions for the purpose of affecting the composition in some other manner. For instance, certain pigments, particularly lake-type pigments and/or certain metal resinates, when added to foamable compositions containing nitrogen evolving foaming agents for the purpose of coloring the same, have the added deleterious effect of reducing foaming agent activation temperature. The degree of this temperature reduction, of course, depends upon the particular nature of the additive having the effect as well as its concentration. However, it has been found that particularly the lake-type pigments and/or the metal resinates, when used in amounts sufficient to obtain the desired degree of coloring, substantially reduce foaming activation temperature.

Essentially any foamable material can be employed within the concept of this invention. Either natural or synthetic, thermoplastic or elastomeric materials can be used. This is for the reason that the reduction in foaming agent activation temperature is apparently not a function of the foamable material per se but is rather dependent upon the characteristic and concentration of certain materials added to the base stock to improve its characteristics in some manner. Such materials are, for example, fillers such as titanium oxide, silica, diatomaceous earth, dispersing agents such as liquid polyisobutylene, dibutylphthalate, mineral oil, etc., antioxidants such as dilauryl thiodipropionate, distearylthiodipropionate, and the like.

Examples of thermoplastic materials that can be employed are polyethylene, polypropylene, copolymerized ethylene and butene-1 copolymers of ethylene and hexene- 1. Examples of natural resins that can be employed are wood resins. Examples of natural elastomers that can be employed are natural rubber. Examples of synthetic elastomers that can be employed are silicone rubber, polybutadiene, copolymerized butadiene-styrene.

Foamable compositions in which the concept of this invention would probably have most favorable application are thermoplastic or elastomeric organic materials, particularly hydrocarbon polymers having softening points within the range of from about 200 to about 475° F. For example, polymers of 1-olefins having softening points within the range of from about 270 to about 475° F. can in many situations be foamed more effectively through the use of the retardant compositions of this invention. Of these materials polypropylene is one of the most difficulty foamable materials due to the fact that relatively high molecular weight substantially crystalline polypropylene has a relatively high melting point which necessarily excludes the use of foaming agents which activate at substantially lower temperatures. For example, substantially crystalline polypropylene having a melt flow value of about 5 as determined by ASTM D 1238–T will have a softening temperature of about 300° F. which necessitates the use of a foaming agent having an activation temperature within the range of from about 350 to about 450° F. As the activation temperatures of foaming agents available are not substantially in excess of this temperature range, it is obvious that a significant reduction in activation due to the deleterious effect of additional components in the foamable composition cannot be tolerated unless, of course, the activation temperature reduction is counteracted by the use of a foaming agent retardant.

Foaming agents with which the concept of this invention is particularly useful are generally the class of nitrogen evolving compounds which decompose to produce nitrogen at elevated temperatures. Such compounds are, for example, selected amides, amines, azides, hydrazides, and azo compounds. Specific examples of applicable foaming agents are barium azodicarboxylate, azodicarbonamide, P,P'-oxybis(benzene sulfonyl hydrazide), N,N'-dimethyl - N,N' - dinitrosoterephthalamide, azobisforamide, azobisisobutyronitrile, toluene-(4) sulfonyl hydrazide, N,N'-dinitrosopentamethylene, and numerous others. The normal activation temperatures of these foaming agents are usualy within the range of from about 200 to about 400° F. and, depending upon the particular foaming agent and the degree of foaming desired, the agents are usually employed in concentrations of from about 0.1 to about 1.0 weight percent based on the heat softenable material, e.g., thermoplastic or elastomer.

Numerous compounds have the effect of accelerating the decomposition of these foaming agents or conversely reducing their activation temperature. Although it is not intended to be limiting, it is believed that the reduction in activation temperature results from the nature of highly polar oxygen-containing compounds, such as, for example, substrates, employed in numerous pigments. In particular, lake dyes are known to have the effect of substantially reducing the activation temperature of these foaming agents by as much as 100° F., depending, of course, on concentration of pigment used. Certain metal resinates are also known to have this effect.

The lake dyes referred to usually comprise a water insoluble heavy metal salt or an organic dye material absorbed or precipitated on an inorganic mordant base or filters such as alumina or hydrated alumina silica or hydrated silica, etc. However, as above mentioned, it is believed that the activation temperature reduction is primarily associated with the nature of the substrate or, in this case, the mordant material rather than the particular organic dye absorbed thereon.

The resinate containing pigments, or more particularly, metal resinates, are neutralized rosin acids which are added to inorganic pigments to impart gloss and improve dispersion. Specific examples of resinate pigments are, for example, chrome green with zinc resinate, cadmium yellow with calcium resinate.

Calcium resinate, zinc resinate and zinc calcium resinates are added to pigments such as chrome green, cadmium yellow, etc., to improve pigmentation to form so-called resinate pigment formulations.

The extent of the activation temperature reduction realized in the use of these pigments, of course, depends upon the concentration of pigment employed. However, at usual pigment concentrations, e.g., within the range of from about 0.5 to about 2.0 weight percent based on foamable material, the reduction of activation temperature of the class of foaming agents described is usually within the range of from about 50 to about 100° F.

The polyglycols such as polyethylene glycol, polypropylene glycol, and polybutene glycol, which are commercially available, employed can have molecular weights within the range of 100 up to about 600. The presently preferred polyglycols are polyethylene glycols having molecular weights of 100 up to about 400.

Depending on the particular foaming agent and the activation temperature required, the concentration of the retardant composition can be within the range of from about 0.1 to about 1.0 weight percent based on foamable material. The weight ratio of magnesium stearate to stearic acid and/or polyglycol is usually within the range of from about 1:1 to about 3:1.

I have found that through the use of this combination of materials to effect an increase in foaming agent activation temperature that a considerably superior synergistic effect is achieved which surpasses that which would be expected to result from the use of either one of these constituents singularly. These results are illustrated in the following example which is intended only to illustrate the application of the concept of this invention.

EXAMPLE

In each of these operations a polypropylene resin having a melt flow value of about 4 was blended with about 0.25 weight percent of antioxidant consisting of 0.1% BHT (butylated hydroxy toluene) and 0.15% DLTDP (dilauryldithiodipropionate, about 0.1 weight percent of polyisobutylene having molecular weight of about 1000, about 2 weight percent Harmon R–6 (Red Lake M) and variant amounts of various retarders were thoroughly mixed for from about 3 to 8 minutes in a Henschell mixer at room temperature. The results were as follows:

| Retardant | Concentration wt. percent on polymer | Foaming temp. °F. | Foam structure |
|---|---|---|---|
| Magnesium stearate | 0.25 | 400 | Fair. |
|  | 0.5 | 400 | Do. |
|  | 1.0 | 400 | Poor. |
|  | 0.25 | 425 | Do. |
|  | 0.5 | 425 | Do. |
|  | [1] 1.0 | 425 | Do. |
| Polyethylene glycol | [1] 0.3 | 425 | Do. |
|  | 0.15 | 425 | Do. |
|  | 0.3 | 400 | Do. |
| Aluminum stearate | [1] 1.0 | 425 | Do. |
|  | 0.5 | 400 | Do. |
| Barium stearate | [1] 0.5 | 400 | Do. |
| Stearic acid | 0.25 | 400 | Good. |
|  | [1] 0.25 | 400 | Fair. |
| Stearic Acid/Magnesium Stearate | 0.15/0.25 | 425 | Good. |
|  | [2] 0.15/0.25 | 425 | Exellent. |
|  | [2] 0.075/0.125 | 425 | Do. |
| Barium Stearate/Magnesium Stearate | 0.25/0.25 | 400 | Poor. |
|  | [1] 0.25/0.25 | 425 | Do. |
| Magnesium Stearate/Polyethylene Glycol | 0.5/0.15 | 425 | Good. |
|  | [2] 0.5/0.15 | 425 | Excellent. |
|  | [2] 0.25/0.075 | 425 | Do. |
| Aluminum Stearate/Magnesium Stearate | 0.25/0.25 | 400 | Fair. |
|  | [1] 0.25/0.25 | 425 | Do. |
| Aluminum Stearate/Barium Stearate | 0.25/0.25 | 400 | Do. |
|  | [1] 0.25/0.25 | 425 | Poor. |
| Aluminum Stearate/Polyethylene Glycol | 0.25/0.15 | 400 | Do. |
|  | [1] 0.25/0.15 | 425 | Do. |
| Barium Stearate/Polyethylene Glycol | 0.25/0.15 | 400 | Do. |
|  | [1] 0.25/0.15 | 425 | Do. |
| Aluminum Stearate/Polyethylene Glycol | 0.25/0.15 | 400 | Fair. |
|  | [1] 0.25/0.15 | 425 | Poor. |

[1] Higher concentrations result in excessive lubrication.
[2] These samples were tested by actual extrusion.

The designation "poor" refers to foamed products having open surface holes as large as about 1/16-inch in diameters; "fair" refers to products in which these surface openings were from about 1/32- to 1/64-inch in diameter and became larger as the product was drawn. "Good" refers to products having only a few extremely small surface openings that were nevertheless expanded on drawing. "Excellent" denotes those samples which had essentially no surface porosity before or after drawing.

These samples were run by two different procedures. In the first procedure (screening test), the several constituents indicated in the example were intimately blended on a rolling mill at 350° F. after which the material was placed in a hydraulic press and heated to the temperature at which performance testing was desired. The sample was then removed from the press and oriented after which the surface was inspected for surface porosity by microscopic methods.

The purpose of these operations and likewise the purpose of this invention is to provide a combination of material which can be foamed to produce a closed cell structure having essentially no surface porosity. I have found that if excessive amounts of blowing agent are employed or if blowing agent decomposes at a relatively low temperature, that the cells thus formed rupture at the surface thereby producing surface porosity which is undesirable in numerous applications particularly in the production of decorative films, ribbons, etc.

The second or alternate method of testing was that of actual extrusion of the foamable composition. Compositions which appear to be promising as indicated by the results of these screening tests were further subjected to actual commercial extrusion operations wherein a foamed film or ribbon was produced at conditions illustrated in the example. These operations were successful in each instance as illustrated in the foregoing table.

The combination of retarders embodied within the scope of the present invention were in each application far superior to each prospective retardant individually. As the deficiencies in foamed structure, i.e., surface porosity, are primarily associated with preactivation of the foaming agent, e.g., reduction in foaming agent activation temperature, it is evident that the inventive compositions are exceedingly effective agents for increasing foaming agent activation temperature. Actually, this effect is probably the result of mitigation of the deleterious effects associated with the pigments employed. However, the additives of this invention may also have the effect of actually retarding the decomposition of the foaming agent per se. Whether or not either of these effects predominate or whether it is the combination of each of these that begets the desired result, it is evident that a more desirable product is obtained.

I claim:
1. A foamable composition comprising a foamable heat softenable natural or synthetic thermoplastic or elastomeric material having dispersed therein a nitrogen evolving foaming agent and a foaming agent activation temperature retardant composition comprising magnesium stearate and at least one retarder selected from the group consisting of stearic acid and a polyglycol compound having a molecular weight within the range of 100 to about 600.

2. The composition of claim 1 further comprising a material which accelerates the decomposition of said foaming agent.

3. The composition of claim 1 wherein said foaming agent is selected from the group consisting of barium azodicarboxylate, azodicarbonamide, P,P' - oxybis(benzene sulfonyl hydrazide), and N,N'-dimethyl-N,N'-dinitrosoterephthalamide.

4. The composition of claim 2 wherein said material is at at least one pigment selected from the group consisting of lake dyes and pigments dispersed on metal resinates.

5. The composition of claim 1 wherein said polyglycol is polyethylene glycol.

6. The composition of claim 1 wherein said heat softenable material is a thermoplastic organic polymer having a softening point within the range of from about 200 to about 475° F., and said foaming agent has a normal activation temperature of from about 200 to about 400° F.

7. The composition of claim 4 wherein the concentration of said pigment is within the range of from about 0.5 to about 2.0 weight percent based on said heat softenable material and the concentration of said foaming agent is within the range of from about 0.1 to about 1.0 weight percent based on said heat softenable material, and the concentration of said retardant composition is within the range of from about 0.1 to about 1.0 weight percent based on said heat softenable material.

8. The composition of claim 1 wherein said heat softenable material is a hydrocarbon 1-olefin polymer having a softening point within the range of from about 200 to about 475° F.

9. The composition of claim 1 wherein said heat softenable material is a polymer of propylene having a melt flow value of about 5; said retardant composition comprises about 0.15 weight percent magnesium stearate and about 0.075 weight percent of stearic acid; and said pigment is selected from lake dyes and pigments dispersed on metal resinates.

10. The composition of claim 1 wherein the ratio of said magnesium stearate to said retarder is within the range of from about 1:1 to about 3:1 on a weight basis.

11. A method of increasing the activation temperature of a nitrogen evolving foaming agent which comprises activating said nitrogen evolving foaming agent dispersed in a foamable heat softenable natural or synthetic thermoplastic or elastomeric material in the presence of a retardant composition comprising magnesium stearate and at least one member of the group consisting of stearic acid and a polyglycol compound having a molecular weight in the range of 100 to about 600.

12. The method of claim 11 wherein said foaming agent has an activation temperature within the range of from about 350 to about 450° F. and wherein said foaming agent is dispersed in a heat softenable composition having a softening point within the range of from about 300 to about 350° F.

13. The method of claim 12 wherein said heat softenable composition is a hydrocarbon thermoplastic polymer.

14. The method of claim 12 wherein said heat softenable composition further comprises a pigment selected from the group consisting of lake dyes and metal resinates, and wherein said foaming agent is selected from the group consisting of barium azodicarboxylate, azodicarbonamide, P,P'-oxybis(benzene sulfonyl hydrazide), N,N'-dimethyl-N,N'-dinitrosoterephthalamide.

15. A structurally stable foam produced by foaming the composition of claim 1.

16. The composition of claim 1 wherein said nitrogen evolving foaming agent is selected from the group consisting of amides, amines, azides, hydrazides, and azo compounds.

17. The composition of claim 1 wherein said polyglycol is polyethylene glycol, polypropylene glycol, or polybutene glycol.

18. The composition of claim 4 wherein said pigment is Harmon R–6 (Red Lake M).

19. The composition of claim 1 wherein said heat softenable material is a polymer of propylene having a melt flow value of about 5; said retardant composition comprises about 0.25 weight percent magnesium stearate and about 0.075 weight percent of a hydrocarbon polyglycol having a molecular weight of about 400, and said pigment is selected from the group consisting of lake dyes and metal resinates.

References Cited

UNITED STATES PATENTS 3,293,094 12/1966 Nairin et al. _____ 260—2.5
3,293,108 12/1966 Nairin et al. _____ 260—2.5

SAMUEL H. BLECH, Primary Examiner

M. FOELAK, Assistant Examiner

U.S. Cl. X.R.

117—161; 260—4, 31.8, 33.6, 41, 41.5, 45.85, 827, 888, 897